No. 763,493. PATENTED JUNE 28, 1904.
R. R. LACEY.
HATCH COVER.
APPLICATION FILED SEPT. 14, 1903.
NO MODEL. 2 SHEETS—SHEET 1.
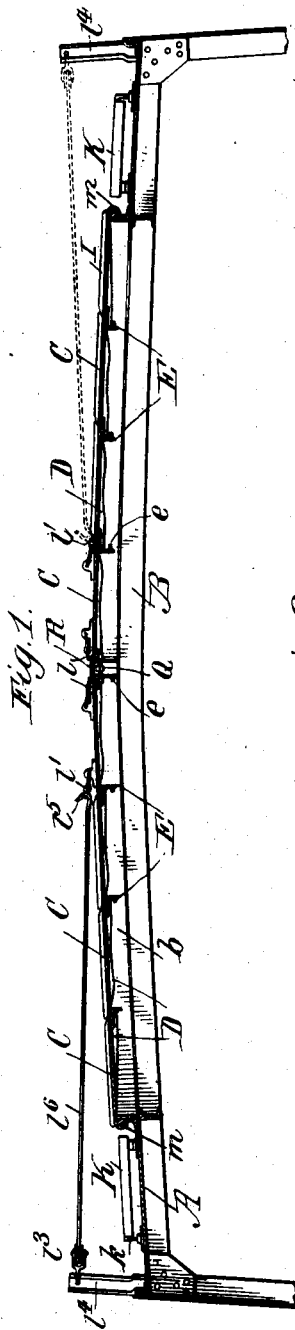
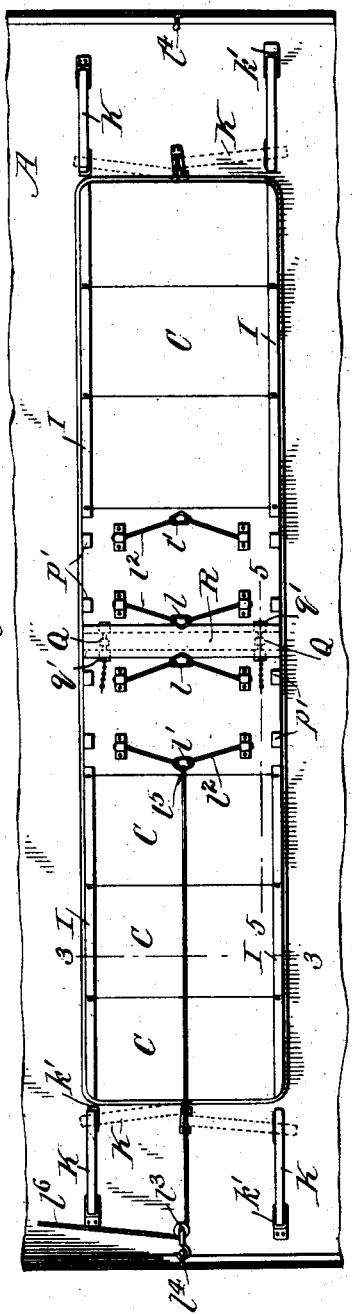
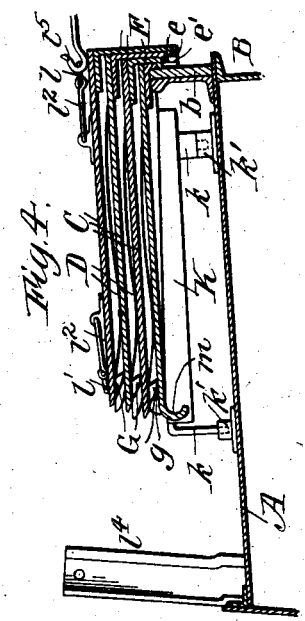
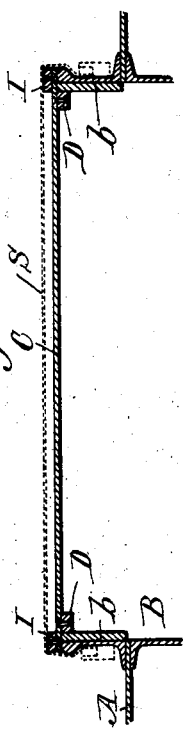
Witnesses: Robt R. Lacey, Inventor.
By Wilhelm Bonner
Attorneys.

No. 763,493. PATENTED JUNE 28, 1904.
R. R. LACEY.
HATCH COVER.
APPLICATION FILED SEPT. 14, 1903.
NO MODEL. 2 SHEETS—SHEET 2.
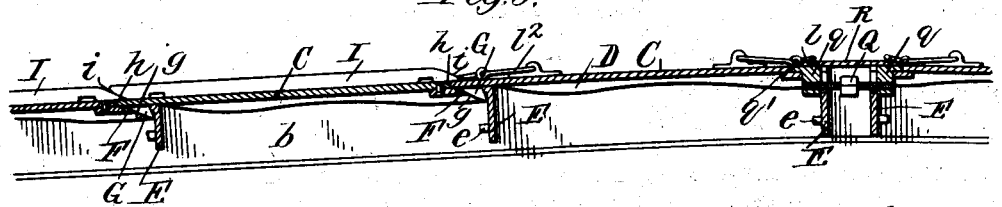
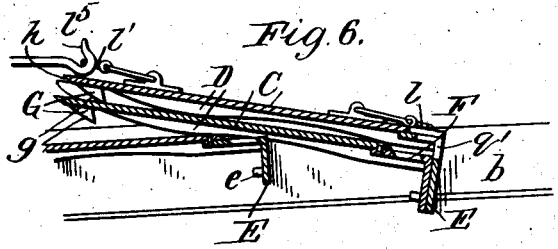
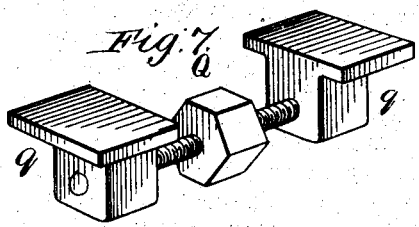
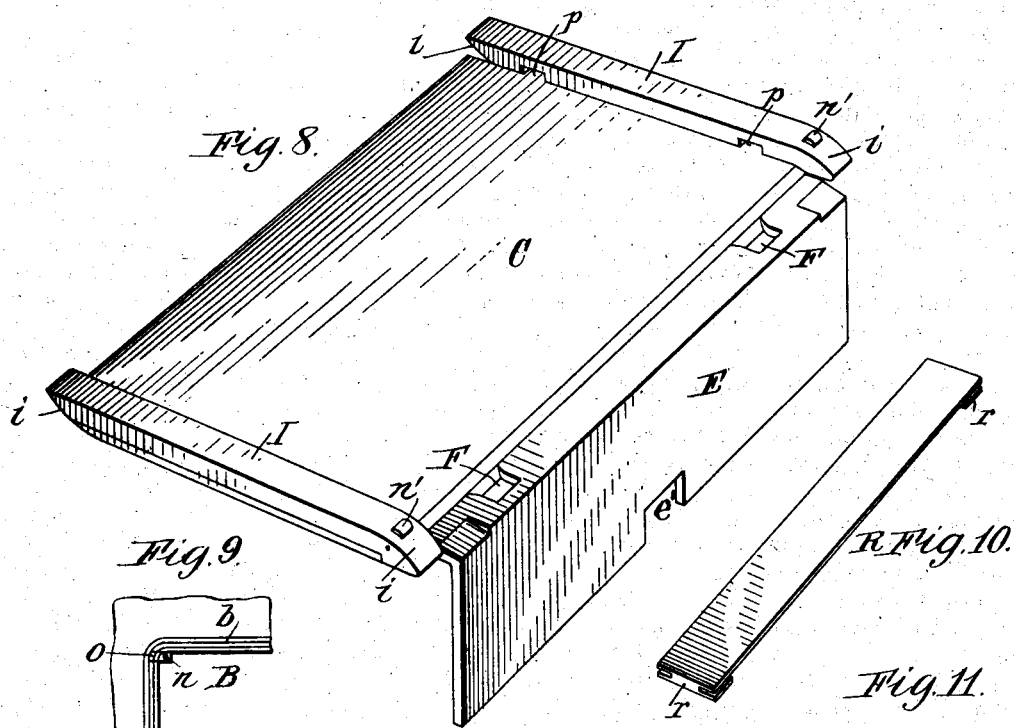
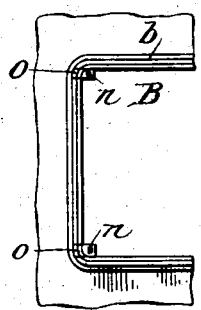
Witnesses,
R. W. Rumer.
J. N. Snyder Jr.
Inventor:
Robt R. Lacey
By Wilhelm Bonner
Attorneys No. 763,493. Patented June 28, 1904.

UNITED STATES PATENT OFFICE.

ROBERT R. LACEY, OF DETROIT, MICHIGAN.

HATCH-COVER.

SPECIFICATION forming part of Letters Patent No. 763,493, dated June 28, 1904.

Application filed September 14, 1903. Serial No. 173,038. (No model.)

*To all whom it may concern:*

Be it known that I, ROBERT R. LACEY, a citizen of the United States, and a resident of Detroit, in the county of Wayne and State of Michigan, have invented new and useful Improvements in Hatch-Covers, of which the following is a specification.

This invention relates to hatch-covers of that kind which are composed of a plurality of separable and portable sliding sections.

One object of the invention is to produce a hatch-cover composed of separable portable sections which is of simple, desirable, and practical construction, affording a secure tight cover for the hatch, and enabling the easy operation of the same.

Another object of the invention is to provide securing devices whereby the hatch-cover can be tightly and securely closed with ease and expedition.

In the accompanying drawings, consisting of two sheets, Figure 1 is a transverse vertical sectional elevation of the deck of a vessel and hatch provided with a cover embodying the invention. Fig. 2 is a plan view thereof. Fig. 3 is a longitudinal vertical section thereof, on an enlarged scale, in line 3 3, Fig. 2. Fig. 4 is a fragmentary transverse vertical section on an enlarged scale, showing one-half of the hatch-cover opened. Fig. 5 is a fragmentary transverse vertical section, on an enlarged scale, in line 5 5, Fig. 2. Fig. 6 is a fragmentary transverse vertical section, on an enlarged scale, showing the position assumed by the cover-sections in opening the hatch. Fig. 7 is a perspective view, on an enlarged scale, of one of the cover-securing devices. Fig. 8 is an enlarged perspective view of one of the hatch-cover sections. Fig. 9 is a fragmentary plan view showing one end of the hatch with the cover removed. Fig. 10 is an enlarged perspective view of the plate for closing the space between the inner cover-sections. Fig. 11 is an enlarged sectional elevation showing the closing-plate in place.

Like letters of reference refer to like parts in the several figures.

The hatch-cover hereinafter described is equally applicable to hatches for vessels, warehouses, and other structures, but is herein only described in connection with a vessel-hatch.

A represents the deck of a vessel, and B a hatch which is surrounded by the usual raised coaming $b$. The hatch is rectangular in shape, and the coaming, as well as the deck, is convexed or slopes downwardly from the center toward the opposite sides of the vessel.

The hatch-cover consists of a plurality of separate sections or plates C, preferably disposed in two oppositely-arranged sets or series, each set constituting one-half of the hatch-cover. The sections of the two sets or halves are slid horizontally in opposite directions toward and from the center of the hatch to close and open the same. As the two sets are alike, one only will be described. Each cover-section is preferably made of a flat rectangular metal plate, the side edges of which overhang and rest upon the hatch-coaming when the hatch is closed and is provided on its under side adjacent to the side edges with depending retaining and guide cleats or strips D, which extend down inside of the sides of the hatch-coaming to hold the cover-sections from side movement and displacement. The several cover-sections are also provided at their inner longitudinal edges with depending vertical flanges E, which extend down between the sides of the coaming. The flanges E are preferably formed by angle-shaped bars or plates having horizontal portions riveted to the under sides of the cover-plates. The vertical flange for each cover-section is deeper than that for the next outer section, so that when the several cover-sections are slid back to open the hatch and are piled or superposed as shown in Fig. 4 all of the flanges will extend down between the coaming sides and prevent the displacement of the sections. Each vertical flange is preferably provided with a horizontally-projecting lug $e$, which engages in a corresponding notch $e'$ in the vertical flange of the adjacent section to prevent the accidental lifting of the inner edge of one section off of the section beneath it.

F represents hook-openings provided in the horizontal portions of the angle-bars of each cover-section except the innermost of the set, and G represents depending hooks located at the outer longitudinal edge of each cover-section except the outermost section of the set. When the hatch is closed the meeting edges of the cover-sections overlap, and the hooks G on each section engage in the hook-openings F in the adjacent section. The outer faces $g$ of the hooks G and the outer edges of the hook-openings are rounded or beveled to enable the hooks to disengage the hook-openings when the sections are slid outwardly to open the hatch, and the inner faces of the hooks are inclined or undercut somewhat to prevent the hooks from slipping out of their openings when closing the hatch and to prevent the detachment of the sections when the hatch is closed. When the hatch is closed, the outer longitudinal edge of one cover-section rests on the top face of the flange-angle of the adjacent section, with the top faces of the several cover-sections substantially flush. The meeting longitudinal edges of the cover-sections are beveled, as indicated at $h$, to prevent the edges from catching and interfering with the proper opening of the hatch. Each of the cover-sections except the innermost is also provided at its side edges with raised guides or tracks I, having oppositely-beveled or rounded ends $i$. The tracks are separated or spaced farther apart than the retaining-cleats on the under sides of the cover-sections, so that the retaining-cleats of one section slide in between the tracks on the next lower section when the hatch is opened.

K, Figs. 1 and 2, represents removable deck-tracks located at the two ends of the hatch for the end sections of the cover to slide upon. Each track is provided with legs or feet $k$, which are removably inserted in sockets $k'$, provided therefor on the deck. When the hatch is to be opened, the deck-tracks are positioned parallel with the sides of the hatch, with their feet in the sockets $k'$, as shown by full lines in Fig. 2, and when the hatch is opened the outer cover-section slides on and is supported by the tracks. When the hatch is closed, the tracks can be moved around into the position indicated by dotted lines in Fig. 2, where they will be out of the way and will not obstruct the deck, or they can be detached from their holding-sockets and removed.

The hatch-cover is operated to open and close the hatch by any suitable means. For this purpose the innermost cover-section of each set is provided with two rings $l$ $l'$, located near the inner and outer edges of the section and each connected to the cover-section by links $l^2$. To open the hatch, a sheave or pulley $l^3$ is removably attached in any suitable manner to a standard or upright $l^4$ at the side of the vessel opposite the end of the hatch, and a hook $l^5$ at the end of a rope or cable $l^6$, running over the said sheave, is engaged in the ring $l'$ at the outer edge of the inner cover-section. By drawing on the free end of the rope or cable the inner cover-section is pulled outwardly, its hooks G disengaging from their openings F in the next outer section and the inner section riding up on the tracks on said next outer section. When the depending flange at the inner edge of the innermost section engages the flange on the adjacent section, the latter is also moved outward, in turn riding upon the tracks of the third section, as indicated in Fig. 6. The several sections of one set are thus successively moved out until all of the sections of the set are superposed and supported by the deck-tracks K. The outward movement of the cover-sections is arrested by the engagement of the vertical flange on the outer section with the end of the hatch-coaming. The other half of the cover is similarly opened by shifting the sheave $l^3$ to the upright $l^4$ at the opposite side of the deck and attaching the hook on the rope to the outer ring of the inner cover-section of the other set. To close the hatch, the hook at the end of the operating-rope is engaged in the inner ring $l$ of the inner cover-section on the far side of the hatch and the sections of one half of the cover drawn into place. In closing the hatch the inner section slides on the tracks I of the next lower section until the hooks G at the outer edge drop into their holes in the inner edge of the next section, when the latter is also drawn inwardly until its hooks in turn engage in the hook-openings in the third section. The hooks of each section thus engage in their hook-openings in the next section until all of the sections of one half of the cover are drawn into place. The sections are arrested in their proper closed position by the engagement of a hooked flange $m$ in the outer edge of the outer section with the end of the hatch-coping. The other half of the hatch is similarly closed. The outer ends of the retaining-cleats on the bottoms of the sections are reduced or rounded to enable the outer edges of the sections to lower and the hooks G to enter their respective hook-openings. Any other suitable means may be employed for operating the hatch-cover.

The friction of the parts is lessened and the operation of the hatch-cover rendered easier by providing antifriction-rollers $n$, Fig. 9, journaled at the ends of the hatch-coaming, on which the outer cover-sections bear when moving the same, and also journaling similar rollers $n'$, Fig. 8, in suitable pockets at the inner ends of the raised tracks on each cover-section for the next section to bear upon when being moved. The ends of the hatch-coaming are also preferably notched at $o$, Fig. 9, opposite the retaining-cleats D for the outer cover-sections, and the retaining-cleats pass through these notches in opening and closing the hatch. The outer sections can thus slide horizontally outward and are not raised, which is desirable.

After the hatch has been opened and the cover-sections piled or superposed as described they are not connected, but simply rest one upon the other, and they can be removed to any desired place. To facilitate carrying the cover-sections, the raised tracks on the same are provided with holes $p$ for the engagement of carrying hooks or devices. The inner sections which do not have the raised tracks are provided with perforated lugs $p'$ for the carrying-hooks.

The hatch-cover is provided with locking or securing devices, preferably constructed as follows:

Q, Figs. 1, 2, 5, and 7, represents bolts or screws having central heads or portions for the engagement of an operating wrench or tool and oppositely-projecting right and left hand threaded shanks which screw into threaded holes in nuts or blocks $q$. The latter are removably seated in correspondingly-shaped holes $q'$ in the adjacent edges of the two inner sections of the cover, in which they are held from turning when the bolts are turned. By turning the bolts or screws the sections of the two sets or halves of the cover are drawn toward each other. As the cover-sections are held in an arc by the curved hatch-coaming they are drawn firmly down upon the coaming by tightening the bolts or screws, and a very secure tight closure is effected without the employment of any additional securing devices, such as are ordinarily used around the several sides of the hatch. As a large number of these fastening devices are ordinarily required, a great saving of time and labor results from the use of the securing devices described.

R represents a plate or bar for closing the space which is left between the adjacent edges of the inner cover-sections. This cover-plate is provided at its opposite ends with flanged depending lugs $r$, the flanges of which are engaged in notches provided in the opposite ends of the adjacent edges of the inner cover-sections. To secure the closing-plate in place, one lug is engaged in its notches and the plate moved endwise and its other end lowered and the other lug slipped into its notches by an opposite endwise movement of the closing-plate. The space between the inner cover-sections can be closed by any other suitable device.

The hatch-cover constructed as above described has no side securing devices, and the ordinary tarpaulin (indicated at S by dotted lines in Fig. 3) can be placed over the hatch and secured in the well-known manner.

I claim as my invention—

1. The combination of a plurality of hatch-cover sections provided at their adjacent edges with detachable interlocking portions and adapted to slide one upon the other to open the hatch, substantially as set forth.

2. The combination of a plurality of hatch-cover sections having overlapping edges provided with detachable interlocking portions and adapted to slide one upon the other to open the hatch, substantially as set forth.

3. The combination of a plurality of hatch-cover sections having overlapping edges provided with detachable coöperating hooks and hook-openings, and adapted to slide one upon the other to open the hatch, substantially as set forth.

4. The combination of a plurality of hatch-cover sections provided at their adjacent edges with detachable interlocking portions, the top faces of said sections being substantially flush when the hatch is closed, and said sections being adapted to slide one upon the other to open the hatch, substantially as set forth.

5. The combination of a plurality of hatch-cover sections, the top faces of which are substantially flush when the hatch is closed and having overlapping edges provided with detachable coöperating hooks and hook-openings, said sections being adapted to slide one upon the other to open the hatch, substantially as set forth.

6. The combination of a plurality of hatch-cover sections having overlapping edges provided with detachable interlocking portions, said sections having coöperating portions whereby the interlocking portions are disengaged and one section caused to ride upon the adjacent section to open the hatch, substantially as set forth.

7. The combination of a plurality of hatch-cover sections provided at their adjacent edges with detachable interlocking portions, one section having raised tracks provided with beveled ends, whereby the other section is caused to ride upon said tracks and said interlocking portions are disengaged, by moving said last-mentioned section horizontally, substantially as set forth.

8. The combination of a plurality of hatch-cover sections provided at their adjacent edges with detachable interlocking portions, cleats on the bottoms of said sections, and tracks on the tops of said sections parallel with said cleats, the tracks on one section serving to support and guide the adjacent section, substantially as set forth.

9. The combination of a hatch-coaming, a plurality of cover-sections provided at their adjacent edges with detachable interlocking portions, cleats on the bottoms of said sections which extend down between the sides of said coaming when the hatch is closed, and tracks on the tops of said sections parallel with and spaced farther apart than said cleats, the tracks on one section serving to support and guide the adjacent section, substantially as set forth.

10. The combination of a hatch, a plurality of cover-sections provided at their adjacent edges with detachable interlocking portions, and having depending flanges at their inner edges, substantially as set forth.

11. A hatch-cover section having an edge portion offset to occupy a plane below the plane of the top of the section, said portion having means for the engagement of coöperating means on an adjacent cover-section, substantially as set forth.

12. A hatch-cover section, comprising a plate, an angle-shaped piece having a horizontal portion secured to the under side of said plate at one edge and having a depending flange, the horizontal portion of said angle-shaped piece having one or more hook-openings for the engagement of hooks on an adjacent section, substantially as set forth.

13. A hatch-cover section, comprising a plate having oppositely-beveled opposite edges, a piece secured to the bottom of said plate and projecting beyond one of said beveled edges, said piece having one or more openings for the engagement of hooks on an adjacent section, substantially as set forth.

14. The combination of two oppositely-disposed hatch-cover sections, and a screw device having threaded engagements with parts carried by said sections for drawing the same together, substantially as set forth.

15. The combination of two oppositely-disposed hatch-cover sections provided with sockets, blocks seated in said sockets and having threaded holes, and a screw having threaded portions working in the threaded holes in said blocks for drawing said sections together, substantially as set forth.

16. The combination of a hatch-cover, comprising a plurality of sections, a part carried by one of said sections and having a threaded hole, a screw working in said threaded hole, and a part to which said screw is connected and toward which said cover-section is moved by said screw, substantially as set forth.

17. The combination of a hatch-cover, comprising a plurality of connected sections arranged in two oppositely-disposed sets, and a securing device located centrally of the hatch for drawing said sets of sections together to secure the cover, substantially as set forth.

18. The combination of oppositely-disposed hatch-cover sections, a screw device for securing said sections together, and a plate detachably connected to said sections for closing the intervening space, substantially as set forth.

19. The combination of a hatch, a hatch-cover comprising a plurality of sections adapted to be slid one on the other, and tracks arranged beyond the ends of said hatch and on which said sections are moved and supported, substantially as set forth.

20. The combination of a plurality of movable hatch-cover sections adapted to occupy substantially the same plane when the hatch is closed, and means acting to stack said sections when they are moved to open the hatch, substantially as set forth.

21. The combination of a plurality of movable hatch-cover sections, detachable interlocking parts on said sections, for causing the same to move successively in opening and closing the hatch, and means acting to stack said sections when they are moved to open the hatch, substantially as set forth.

22. The combination of a plurality of sliding hatch-cover sections provided at their adjacent edges with detachable interlocking portions, the top faces of said sections being substantially flush when the hatch is closed, substantially as set forth.

Witness my hand this 11th day of September, 1903.

ROBERT R. LACEY.

Witnesses:
EDWARD C. HEARD,
C. B. HORNBECK.